United States Patent Office 2,949,449
Patented Aug. 16, 1960

2,949,449

SYNTHESIS OF 3,5-DIAROYL-2-DEOXY-D-RIBO-FURANOSYL UREAS

Max Hoffer, Nutley, N.J., assignor to Hoffmann-La Roche Inc., Nutley, N.J., a corporation of New Jersey No Drawing. Filed Jan. 14, 1959, Ser. No. 786,709

15 Claims. (Cl. 260—210)

This invention relates to a novel method of synthesizing the nucleoside thymidine. Thymidine is a well known substance which has found wide application in biochemical investigations and in enzymatic preparations.

This application is a continuation-in-part of my pending application Serial No. 732,125, filed May 1, 1958, now abandoned.

By way of comprehensive statement, the invention relates to a process of making thymidine which comprises methylating deoxyribose, thereby forming methyldeoxyribofuranoside; aroylating the latter, thereby forming diaroylmethyldeoxyribofuranoside; demethylating the latter by reaction with HCl (or HBr), thereby forming diaroyldeoxyribofuranosyl chloride (or diaroyldeoxyribofuranosyl bromide); hydrolyzing the halogen atom, thereby forming diaroyldeoxyribofuranose; reacting the latter with urea, thereby forming diaroyldeoxyribofuranosylurea; reacting the latter with (lower alkoxy)methylacryloyl halide, thereby forming 1-(lower alkoxy)methylacryloyl-3-diaroyldeoxyribofuranosylurea; cyclizing the latter, thereby forming diaroylthymidine; and dearoylating the latter to produce thymidine. Preferred aroylating agents for use in this process are, for example, acid anhydrides and acid halides of monocyclic aromatic acids; especially acid anhydrides, acid chlorides and acid bromides containing the acyl radical

wherein R represents a radical containing not more than ten carbon atoms selected from the group consisting of monocyclic aryl hydrocarbon radicals and negatively substituted monocyclic aryl hydrocarbon radicals. Especially preferred are such aroylating agents wherein R represents phenyl, p-(lower alkyl)phenyl, p-(lower alkoxy)phenyl, p-chlorophenyl, p-bromophenyl and p-nitrophenyl. Illustrative of aroylating agents which are preferred for use in the process of the invention are, for example, benzoic anhydride, benzoyl chloride, benzoyl bromide, p-toluoyl chloride, anisoyl bromide, p-chlorobenzoyl chloride, p-nitrobenzoyl bromide, and the like.

The process of the invention described generically above can be illustrated schematically by the following flow sheet, wherein R represents a radical containing not more than ten carbon atoms selected from the group consisting of monocyclic aryl hydrocarbon radicals and negatively substituted monocyclic aryl hydrocarbon radicals:

FLOW SHEET (I) 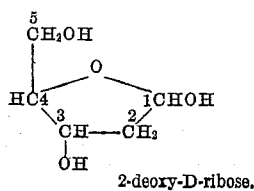
2-deoxy-D-ribose.

↓

(II) 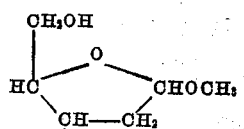
1-methyl-2-deoxy-D-ribofuranoside.

↓

(III) 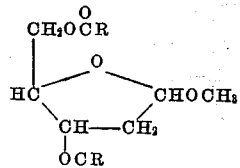
3,5-diaroyl-1-methyl-2-deoxy-D-ribofuranoside.*

↓

(IIIa) 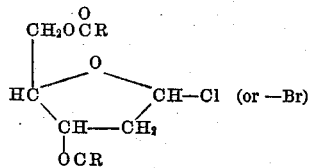
3,5-diaroyl-2-deoxy-D-ribofuranosyl chloride (or bromide).*

↓

(IV) 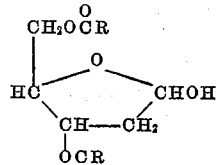
3,5-diaroyl-2-deoxy-D-ribofuranose.*

↓

(V) 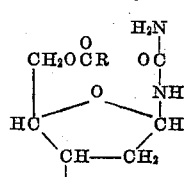
(3,5-diaroyl-2-deoxy-D-ribofuranosyl)urea.*

↓

(VI) 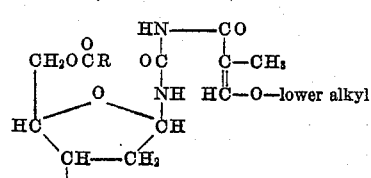
1-(β-[lower alkoxy]-α-methylacryloyl)-3-(3,5-diaroyl-2-deoxy-D-ribofuranosyl)urea.*

↓

*Aroyl=R—C—, as defined above.

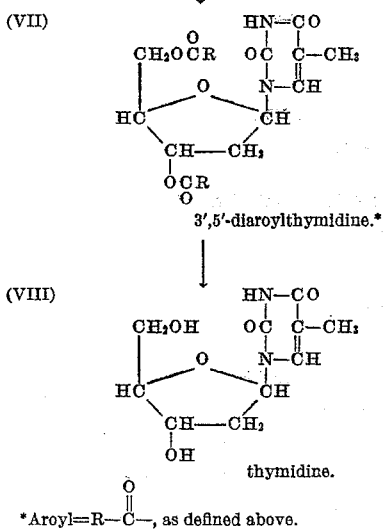

*Aroyl=R—C(=O)—, as defined above.

In a more specific illustrative embodiment, the invention provides a process of making thymidine which comprises reacting 2-deoxy-D-ribose with methanol, thereby forming 1-methyl-2-deoxy-D-ribofuranoside; reacting the latter with a benzoylating agent, thereby forming 3,5-dibenzoyl-1-methyl-2-deoxy-D-ribofuranoside; cleaving the methyl group from the latter, thereby forming 3,5-dibenzoyl-2-deoxy-D-ribofuranoes; reacting the latter with urea, thereby forming (3,5-dibenzoyl-2-deoxy-D-ribofuranosyl)urea; reacting the latter with β-(lower alkoxy)-α-methylacryloyl halide, thereby forming 1-(β-[lower alkoxy]-α-methylacryloyl)-3-(3,5-dibenzoyl - 2 - deoxy-D-ribofuranosyl)urea; cyclizing the latter, thereby forming 3′,5′-dibenzoylthymidine; and debenzoylating the latter, thereby forming thymidine. Similarly, other specific processes of the invention employ p-chlorobenzoyl chloride, anisoyl chloride, p-toluoyl chloride and p-nitrobenzoyl chloride as the particular aroylating agent in each case, respectively.

The first stage of the process of the invention comprises methylating 2-deoxy-D-ribose (I). This can be effected by methods known per se, most conveniently by allowing the deoxyribose to stand with methanol in the presence of a small amount of mineral acid.

The next stage comprises aroylating the methyldeoxyribofuranoside (II) produced in the first stage. A convenient method of effecting this conversion is to react the methyldeoxyribofuranoside with an aroylating agent of the kind previously referred to (e.g. benzoyl chloride or benzoyl bromide) at moderate temperatures (for example at room temperature or temperatures which exceed room temperature only very slightly) in the presence of an organic tertiary base (for example pyridine). The product of this stage is diaroylmethyldeoxyribofuranoside (III).

The next stage comprises treating the diaroylmethyldeoxyribofuranoside so as to replace the methoxy group therein by a hydroxy group. An advantageous method of effecting this replacement comprises cleaving the methoxy group from the said deoxyribofuranoside by treatment with anhydrous hydrogen chloride (or less preferably anhydrous hydrogen bromide), thereby forming (IIIa) as an intermediate cleavage product, i.e. diaroyldeoxyribofuranosyl chloride (or less preferably, diaroyldeoxyribofuranosyl bromide); and hydrolyzing the halogen atom in said intermediate product, e.g. by treatment with moist silver carbonate thereby forming diaroyldeoxyribofuranose (IV). The intermediate halogen-containing product (IIIa) need not be isolated; indeed, in many cases it will be convenient to hydrolyze it in situ. A preferred mode of executing this stage of the overall process comprises reacting diaroylmethyldeoxyribofuranoside with anhydrous hydrogen chloride in acetic acid, thereby forming diaroyldeoxyribofuranosyl chloride, and mixing the latter with moist silver carbonate in acetone, thereby forming diaroyldeoxyribofuranose.

The next stage comprises reacting the diaroyldeoxyribofuranose (IV) with urea. This reaction is conveniently effected by allowing the two reactants, in solution in a lower alkanol, e.g. methanol or ethanol, and in the presence of a mineral acid, e.g. hydrochloric acid or sulfuric acid, to stand at room temperature.

The next stage of the synthesis comprises reacting the diaroyldeoxyribofuranosylurea (V), produced in the preceding stage, with a β-(lower alkoxy)-α-methylacryloyl halide. Preferably, β-ethoxy-α-methylacryloyl chloride is employed; however, one can also use β-methoxy-α-methylacryloyl chloride. The corresponding bromides can also be employed, if desired.

The next stage comprises cyclizing the 1-(β-[lower alkoxy]-α-methylacryloyl)-3-(3,5-diaroyl - 2 - deoxy-D-ribofuranosyl) urea (VI) produced in the preceding stage. The cyclization is conveniently effected by allowing the substituted urea to stand with a solution of a small proportion of concentrated mineral acid (preferably concentrated hydrochloric acid) in acetic acid. The cyclization results in 3′,5′-diaroylthymidine (VII).

The last stage of the synthesis comprises the hydrolysis of the diaroylthymidine to thymidine itself (VIII). This conversion can be effected by known methods, for example by saponifying the diaroylthimidine with ammonia or with barium methylate.

The invention is further disclosed in the following examples, which are illustrative but not limitative thereof. Temperatures are stated in degrees centigrade, uncorrected. The yields stated are also merely illustrative.

*Example 1*

Twenty g. of dry crystalline 2-deoxy-D-ribose was dissolved in 360 ml. of methanol by gentle warming. The solution was cooled to 27° and 40 ml. of 1% HCl in methanol was added. The solution was allowed to stand for exactly 20 minutes at 27° while excluding moisture of the air. Five g. of silver carbonate was added and the mixture was thoroughly stirred until it no longer reacted acidic. The silver salts were removed by filtration. The methanol was distilled off in a vacuum as completely as possible. Twenty ml. of dry pyridine was added, and the solution was again evaporated in a vacuum in order to remove the last traces of methanol. The residue was taken up in 100 ml. of pyridine and the solution of 1-methyl-2-deoxy-D-ribofuranoside was cooled in ice water to 5° to 10°.

Forty ml. of benzoyl chloride was added in small portions to the cooled solution of methyldeoxyribofuranoside, obtained in the preceding paragraph, at such a rate that the temperature stayed below 25° while cooling with ice water. The mixture was allowed to stand at 20° to 30° for two hours, then at 40° to 45° for two hours. The excess of benzoyl chloride was then decomposed by the addition of ice and 200 ml. of ethyl acetate was added. The solution obtained was shaken twice, each time with 300 ml. of water; then twice with a cold saturated solution of potassium bisulfate; then again with water; and finally with a saturated potassium bicarbonate solution. The pale yellow ethyl acetate layer was dried overnight over magnesium sulfate, and after filtration was evaporated to dryness in a vacuum. The residue (55 g.) was a honey-colored thin syrup of 3,5-dibenzoyl-1-methyl-2-deoxy-D-ribofuranoside.

The entire amount of the dibenzoylmethyldeoxyribofuranoside obtained in the preceding paragraph was dissolved at 5°–10° in 200 ml. of acetic acid saturated with dry HCl (32 g.) and the solution was kept at 10°–15° for exactly 12 minutes. At this time, the solution began to discolor visibly. The solution, containing the 3,5-dibenzoyl-2-deoxy-D-ribofuranosyl chloride formed, was immediately poured into 1 liter of ice water. The precipitated gum was extracted three times with methylene chloride (a total of 250 ml.). The methylene chloride layer was washed with water, then with potassium bicarbonate solution; and the washed methylene chloride solution was added to a well stirred suspension of 30 g. of freshly precipitated, moist silver carbonate in 750 ml. of acetone. The mixture was stirred well for three hours and was then filtered. The filtrate was evaporated in vacuo, yielding a light amber syrup of 3,5-dibenzoyl-2-deoxy-D-ribofuranose (50 g.).

The total amount of the dibenzoyldeoxyribofuranose obtained in the preceding paragraph was dissolved in 150 ml. of methanol. To the solution were added 50 g. of urea and 30 ml. of 3 N aqueous HCl, and the mixture was allowed to stand for 72 hours at 25°–30°. After 12 hours, the reaction product started to separate in voluminous flakes. The material was finally poured into 1 liter of water and the product precipitated partly in the form of suspended flakes, partly as a rapidly solidifying gum. It was collected by filtration, the solid was slurried thoroughly with ether, filtered by suction, washed with water and ether, and dried over $P_2O_5$ in a vacuum desiccator. There was obtained a buff-colored powder (33 g.) of (3,5-dibenzoyl-2-deoxy-D-ribofuranosyl)urea, M.P. 100°–116°. (A highly purified sample of the compound melted at 139°–140°.)

7.7 g. of the dibenzoyldeoxyribofuranosylurea (M.P. 100°–116°) obtained in the preceding paragraph was suspended in 80 ml. of methylene chloride and 15 ml. of freshly dried pyridine, and then 3 ml. of freshly distilled β-ethoxy-α-methylacryloyl chloride was added. The mixture was allowed to stand at 25° to 30° for five hours while excluding moisture of the air. Then 3 ml. of β-ethoxy-α-methylacryloyl chloride was added and the mixture was allowed to stand at 25° to 30° for 40 hours. The amber solution showed a rotation of +1.0 to +1.4 in a 10 cm. tube. To the solution were added 200 ml. of ether and 100 ml. of water, and the layers were separated. The upper (ether+methylene chloride) layer was washed with water, twice with saturated $KHSO_4$ solution to remove pyridine, and then with water and $KHCO_3$ solution. Finally, it was evaporated in a vacuum to an amber syrup of 1-(β-ethoxy-α-methylacryloyl)-3-(3,5-dibenzoyl-2-deoxy-D-ribofuranosyl)urea.

(The preparation of β-ethoxy-α-methylacryloyl chloride, employed as a reagent in the above paragraph, is described herein for convenience of reference:

144 g. of methyl β-ethoxy-α-methylacrylate was refluxed with 600 ml. of 2 N aqueous sodium hydroxide solution, while stirring. The clear solution was cooled and acidified with 125 ml. of concentrated hydrochloric acid, whereupon free β-ethoxy-α-methylacrylic acid precipitated as a thick white crystalline mass. The crystals were filtered by suction, washed on a filter with 125 ml. of ice water, and dried at 50°. β-Ethoxy-α-methylacrylic acid crystallized from water in large white prisms, M.P. 104°–106°.

26 g. of β-ethoxy-α-methylacrylic acid was refluxed with 25 g. of thionyl chloride for one hour on a steam bath, while excluding moisture of the air. The clear liquid thus obtained was distilled in vacuo at 75°–78° (9 mm.), thereby yielding β-ethoxy-α-methylacryloyl chloride, as a colorless liquid of pungent odor.)

The entire amount of the (β-ethoxy-α-methylacryloyl)-(dibenzoyldeoxyribofuranosyl)urea obtained above was dissolved in 60 ml. of acetic acid, and 6 ml. of concentrated aqueous hydrochloric acid was added. The solution discolored rapidly. After four hours, the solution was poured into 300 ml. of water. The product separated partly as a discolored sticky amorphous precipitate. Forty g. of sodium carbonate was added carefully in small portions, while stirring, in order to neutralize the hydrochloric acid and a large part of the acetic acid. The material was extracted twice, each time with 75 ml. of ethyl acetate; the combined ethyl acetate layers were washed acid-free with saturated $KHCO_3$ solution and filtered by suction through a layer of charcoal. The filtrate, still dark-brown, was evaporated in a vacuum and the residue was dissolved in 20 ml. of hot alcohol. After cooling the solution and seeding, crystals of 3',5'-dibenzoylthymidine were deposited, soon filling the whole vessel. The mixture was allowed to stand for 72 hours and the crystals were filtered by suction and washed on the filter with cold alcohol. The yield of crude material (M.P. 175°–180°) amounted to 2.6 g. A single recrystallization from 75 ml. of alcohol, with charcoal, yielded 2.4 g. of 3',5'-dibenzoylthymidine, melting at 191°–192°, and showing no depression in a mixed melting point determination with an authentic sample of 3',5'-dibenzoylthymidine melting at 195°.

2.0 g. of 3',5'-dibenzoylthymidine, M.P. 191°–192°, obtained in the preceding paragraph, was suspended in 100 ml. of alcohol and the solution was saturated with anhydrous ammonia in the cold. The mixture was then heated in a sealed tube at 80° for 8 to 10 hours. A clear, colorless solution resulted. It was evaporated to dryness in a vacuum, the remaining syrup was taken up with 20 ml. of water and 20 ml. of ether, the layers were separated, and the aqueous layer was evaporated again in a vacuum, yielding a syrup. Upon seeding and slurrying with a little acetone, the material crystallized completely. It was filtered by suction and washed on the filter with a little acetone. The melting point of the product, thymidine, was 170°–175°, but showed no depression in a mixed melting point determination with an authentic sample of thymidine (M.P. 185°). The yield was 0.95 g. One recrystallization from alcohol raised the melting point to the correct value of 185°.

*Example 2*

3.5 g. of dry crystalline 2-deoxy-D-ribose was dissolved in 63 ml. of methanol and 7 ml. of a 1% solution of anhydrous hydrogen chloride in methanol was added. The mixture was allowed to stand for 20 minutes at 27°. Five g. of silver carbonate was added and the mixture was stirred thoroughly. The silver salts were removed by filtration. The methanol was distilled off in a vacuum as completely as possible, the residue was diluted with 10 ml. of anhydrous pyridine, and the solution was again evaporated in a vacuum in order to remove the last traces of methanol.

The oily residue, crude 1-methyl-2-deoxy-D-ribofuranoside, was dissolved in 20 ml. of anhydrous pyridine and 8 ml. of p-chlorobenzoyl chloride was added in portions while cooling with ice water to maintain the temperature between 20° and 40°. The mixture was allowed to stand overnight, water and methylene chloride were added, the layers were separated, and the methylene chloride layer was washed successively with $KHSO_4$ solution and water, dried over sodium sulfate and finally evaporated in a vacuum.

The syrupy residue, 3,5-di(p-chlorobenzoyl)-1-methyl-2-deoxy-D-ribofuranoside, was dissolved in 20 ml. of acetic acid and 50 ml. of a cold saturated solution of anhydrous hydrogen chloride in 100 ml. acetic acid was added at 10–15°. Crystallization of 3,5-di(p-chlorobenzoyl)deoxyribofuranosyl chloride occurred.

(A sample of this material, separately prepared and purified for analysis, had the following characteristics: M.P.=118°–120° (dec.)

*Analysis.*—$C_{19}H_{15}O_5Cl_3$, calc'd: C, 53.0; H, 3.5; Cl, 24.8. Found: C, 52.56; H, 3.77; Cl, 25.01; 25.25.)

After 15 minutes the crystalline mush was poured on ice, and the precipitate was extracted from the aqueous suspension with three portions of methylene chloride of 30 ml. each. The combined methylene chloride layers were washed with water, then with $KHCO_3$ solution and finally added to a stirred suspension of 10 g. of moist silver carbonate in 250 ml. of acetone. The mixture was stirred for an hour and then was freed of silver salts by filtration. The clear filtrate was evaporated to a syrup which consisted mostly of 3,5-di(p-chlorobenzoyl)-2-deoxy-D-ribofuranose.

The whole of the last mentioned syrup was dissolved in 50 ml. of methanol, 7 g. of urea and 5 ml. of 3 N aqueous hydrochloric acid were added, and the mixture was allowed to stand for 48 hours with occasional shaking. By that time, [3,5-di(p-chlorobenzoyl)-2-deoxy-D-ribofuranosyl]urea had separated as a voluminous solid. After addition of water, the material was filtered by suction, washed on the filter with water, alcohol and ether, and recrystallized from pyridine-water (1:1). [3,5-di(p-chlorobenzoyl)-2-deoxy-D-ribofuranosyl]urea crystallized in long needles melting at 176° with decomposition. The yield, 6.7 g., corresponded to 57% of theory. $[\alpha]_D^{20} +47°$, 1% in glacial acetic acid.

6.2 g. of [3,5-di(p-chlorobenzoyl)-2-deoxy-D-ribofuranosyl]urea was suspended in 60 ml. of methylene chloride and 15 ml. of dry pyridine. Five ml. of freshly distilled β-ethoxy-α-methacryloyl chloride was added and the mixture allowed to stand with occasional shaking. The solid went into solution within six hours. After 24 hours, 100 ml. of water and 100 ml. of ethyl acetate were added. The layers were separated, the ethyl acetate-methylene chloride layer was washed successively with $KHSO_4$ solution, water, $KHCO_3$ solution, and water, and was finally evaporated in a vacuum.

The amber, very viscous residue, representing crude 1-(β-ethoxy-α-methacryloyl) - 3 - [3,5-di(p - chlorobenzoyl)-2-deoxy-D-ribofuranosyl]urea was dissolved in 60 ml. of acetic acid, 6 ml. of concentrated aqueous hydrochloric acid was added and the mixture was allowed to stand for two to three hours at 20 to 25°. It was then poured on 300 g. of ice, whereupon the crude thymidine derivative precipitated as an amorphous but filterable mass. When the ice was melted, the material was filtered by suction, washed with water and dried in a desiccator at room temperature. It was then dissolved in a little ethyl acetate, heptane was added to an incipient turbidity, and the compound was allowed to crystallize for several days. The crystals were filtered by suction, suspended in alcohol, filtered again and recrystallized from 80–90% acetic acid; ethyl-acetate-heptane or acetone can also be used. The yield of 1.2 g. of 3',5'-di(p-chlorobenzoyl)-thymidine corresponded to 17% of theory; M.P. 192–193°.

The last named compound was saponified to thymidine in the manner described in Example 1.

Example 3

Methyldeoxyribofuranoside, prepared from 3.5 g. of deoxyribose in similar manner to that described in Example 2, was dissolved in 20 ml. of dry pyridine and anisoylated by reaction with 9.0 g. of anisoyl chloride, similarly to Example 2. The resulting syrupy methyldianisoyldeoxyribofuranoside was reacted with 50 ml. of glacial acetic acid saturated with anhydrous hydrogen chloride. The solution containing dianisoyldeoxyribofuranosyl chloride was poured into ice water, the precipitate was extracted with methylene chloride, the extract was washed acid-free with $KHCO_3$ solution and then was treated with 10 g. of moist silver carbonate in acetone. After removal of the silver salts and evaporation of the filtrate in vacuo, dianisoyldeoxy ribofuranose was obtained as a viscous amber syrup. It was taken up in 30 ml. of methanol and 7 g. of urea, and 4 ml. of 3 N aqueous hydrochloric acid was added. The mixture was allowed to stand for 48 hours at 25 to 30°, with occasional shaking, whereupon a voluminous crystalline precipitation of (3,5-dianisoyl-2-deoxy-D-ribofuranosyl)-urea took place. After addition of water the precipitate was filtered by suction, washed on the filter with water, alcohol and ether, and finally recrystallized from pyridine + water (1:1, 60 ml.). It formed colorless crystalline warts melting at 175°, and showing a specific rotation of $[\alpha]_D^{22} = +47.8°$ in a 1% solution in acetic acid. The yield amounted to 4.3 g., corresponding to 38% of theory.

4 g. of the above dianisoyldeoxyribofuranosylurea was suspended in 40 ml. of methylene chloride and 10 ml. of dry pyridine. Three g. of β-ethoxy-α-methacryloyl chloride was added and the mixture was allowed to stand for 48 hours while excluding atmospheric moisture. The solid went into solution within 24 hours. After working up the material as in the preceding example, the crude ethoxymethacryloylurea compound was dissolved in 40 ml. of acetic acid, 4 ml. of concentrated hydrochloric acid was added, the mixture was allowed to stand for two hours, then poured into water, the precipitated material was extracted with ethyl acetate, and the ethyl acetate layer was washed acid-free with $KHCO_3$ solution. After evaporation, the residue was treated with a little alcohol and seeded for crystallization. In the course of three to four days, 0.8 g. of 3',5'-dianisoylthymidine had deposited. Recrystallized from 100 times its amount of alcohol, it melted at 195° and showed a rotation of $[\alpha]_D^{25} = -47.9°$, 2% in pyridine. This was saponified to thymidine in similar manner to Example 2.

Example 4

Methyl di(p-toluoyl)deoxyribofuranoside, prepared from 3.6 g. of deoxyribose and 8.7 g. of p-toluoyl chloride in similar manner to Example 2, a light amber syrup, when reacted with 100 ml. of acetic acid saturated in the cold with anhydrous hydrogen chloride, yielded crystalline di(p-toluoyl)deoxyribofuranosyl chloride.

The di(p-toluoyl)deoxyribofuranosyl chloride was converted to 3,5-di(p-toluoyl)deoxyribofuranose by pouring it into water, extracting the precipitated material with methylene chloride, washing the extract acid-free with $KHCO_3$ solution, treating with moist silver carbonate in acetone, and obtaining a syrup of 3,5-di-p-toluoyldeoxyribofuranose, similarly to Example 2. The latter syrup was dissolved in 30 ml. of methanol and the solution was allowed to stand with 7 g. of urea and 4 ml. of 3 N HCl for 48 hours, whereby 4.0 g. of (3,5-di-p-toluoyl-2-deoxy-D-ribofuranosyl)urea, melting at 163°–165°, was obtained. Recrystallization from a large amount of alcohol—from which the material, however, tended to separate upon cooling as a gelatinous mass—raised the M.P. to 184°. $[\alpha]_D^{22} = +58°$, 1% acetic acid. The rotation in pyridine, 1% solution, was found to be almost zero.

3 g. of (3,5-di-p-toluoyl-2-deoxy-D-ribofuranosyl)urea was suspended in 30 ml. of methylene chloride, 8 ml. of pyridine and 2.5 ml. of β-ethoxy-α-methacryloyl chloride were added, and the mixture was allowed to stand for 48 hours. (The material was already dissolved after five hours.) After dilution with ethyl acetate and water, the oily layer was washed successively with $KHSO_4$ solution to remove pyridine, then with water and potassium bicarbonate solution, and after drying over sodium sulfate was evaporated to dryness. The remaining syrupy crude 1-ethoxymethacryloyl - 3 - (ditoluoyldeoxyribofuranosyl) urea was dissolved in 30 ml. of glacial acetic acid, and 3 ml. of concentrated hydrochloric acid was added. After three hours, the mixture was poured into ice water and extracted with ethyl acetate; the ethyl acetate layer was washed acid-free, first with water, then with potassium bicarbonate solution, and was dried over sodium sulfate. The solution was evaporated in a vacuum to a syrup, the residue was dissolved in 10 ml. of alcohol, and the solution was seeded. It deposited 720 mg. (20%) of 3',5'-di-(p-toluoyl)thymidine in the course of several days. Recrystallized from alcohol, the compound melted at 197° and showed a rotation of $[\alpha]_D^{22} = -50.0 \pm 0.5°$ (2% in pyridine).

2.4 g. of 3',5'-di(p-toluoyl)thymidine was suspended in 50 ml. of methanol and 1 ml. of 0.5 N barium methylate in methanol was added. The mixture was allowed to stand at 0–5° for 24 hours, with occasional shaking. To the clear solution was added 1 ml. of 0.5 N sulfuric acid, the methanol was distilled off in a vacuum, and the residue was washed with ether to remove methyl toluate. When seeded, the material solidified completely to a crystalline cake of thymidine. To remove contaminating barium sulfate, it was dissolved in 20–30 ml. of hot alcohol, the solution was cleared by filtration through a filter aid (Celite) and the filtrate was evaporated in a vacuum. The crystalline residue showed a melting point of 185°, which gave no depression with an authentic sample of thymidine. The yield, 1 g., was substantially quantitative.

Example 5

Methyl di(p - nitrobenzoyl)deoxyribofuranoside, prepared from 3.5 g. of deoxyribose and 9.4 g. of p-nitrobenzoyl chloride as in Example 2 above, a yellowish syrup, was dissolved in HCl-acetic acid (50 ml.). After 15 minutes, the solution was poured into ice-water, the precipitated material was extracted three times with 50 ml. of ethylene chloride each time, the extract washed with water and potassium bicarbonate solution and was added to a stirred suspension of 15 g. of silver carbonate in 250 ml. of acetone. After one hour, the silver salts were removed by filtration and the filtrate was evaporated to a syrup in a vacuum. The residue, crude di(p-nitrobenzoyl)deoxyribofuranose, was suspended in 50 ml. of methanol, and 7 g. of urea and 5 ml. of 3 N aqueous hydrochloric acid were added. The mixture was allowed to stand with frequent shaking. After one hour, the poorly soluble di(p-nitrobenzoyl)deoxyribofuranosylurea began to crystallize, and after 24 hours the crystals filled the whole vessel. The material was filtered by suction, washed with water, alcohol and ether, and was recrystallized from 200 ml. of pyridine. The compound [3,5-di(p-nitrobenzoyl)-2-deoxy-D-ribofuranosyl]urea formed long white needles melting at 196° and showing a rotation of $[\alpha]_D^{22} = +54°$ (1% in acetic acid).

The condensation of the above di(p-nitrobenzoyl)deoxyribofuranosylurea with β-ethoxy-α-methacryloyl chloride in the presence of pyridine proceeded much more slowly than in the other examples of the invention herein described, probably because of the low solubility of the starting material. Four g. of this urea derivative in 40 ml. of methylene chloride, 10 ml. of dry pyridine and 3 g. of β-ethoxy-α-methacryloyl chloride had to be allowed to stand at 25 to 30° for six days, with frequent shaking, in order to form a homogeneous solution. After dilution with 200 ml. of ethyl acetate, washing with water, KHSO$_4$ solution and KHCO$_3$ solution, the ethyl acetate-methylene chloride layer was evaporated to dryness. The residue, when treated with ether, became solid and brittle and was filtered in this form. It formed a light brown, not distinctly crystalline powder. The yield of 1-(β-ethoxy-α-methacryloyl)-3-[3,5-di(p-nitrobenzoyl) - 2-deoxy-D-ribofuranosyl]urea amounted to 3.7 g., corresponding to 75% of theory.

One g. of the latter material was suspended in 15 ml. of acetic acid and 1.5 ml. of concentrated aqueous hydrochloric acid was added. The suspended material dissolved completely after 20 minutes. After standing for 2.5 hours at 25–30°, the product was precipitated as a grayish amorphous solid. It was collected by filtration and was slurried with 3 to 5 ml. of acetone. The material rapidly became crystalline, was filtered by suction and washed with acetone on the filter to remove color. The product melted at 167–168° and the melting point was not changed by recrystallization from acetone, acetic acid, or ethyl acetate. The yield of 230 mg. of 3′,5′-di(p-nitrobenzoyl)thymidine corresponded to 25% of theory. This material was saponified to thymidine as in Example 4 above.

In another experiment, 0.7 g. of (1-β-ethoxy-α-methacryloyl)-3-[di(p-nitrobenzoyl) - 2 - deoxy-D-ribofuranosyl]urea, reprecipitated twice from 90% acetic acid, gave 270 mg. of 3′,5′-di(p-nitrobenzoyl)thymidine, corresponding to a yield of 40% of theory.

Example 6

13.6 g. of 2-deoxy-D-ribose was dissolved in 245 ml. of methanol and 27 ml. of a 1% solution of anhydrous hydrogen chloride in methanol was added. The mixture was allowed to stand for 20 minutes at 27° and then was stirred with 5 g. of silver carbonate until it no longer reacted acidic. The silver salts were removed by filtration with suction and were washed with methanol. The combined filtrate and washings were evaporated in a vacuum as far as possible, 20 ml. pyridine was added and the solution was again evaporated in a vacuum in order to remove the last traces of methanol.

The syrupy residue of 1-methyl-2-deoxy-D-ribofuranoside was then dissolved in 80 ml. of dry pyridine, the solution was cooled to approximately 0°, and 34 g. of p-toluoyl chloride was added in portions while maintaining the temperature below 20°. After the addition of the chloride, the temperature was allowed to rise to 40–45° and kept there for two hours. The mixture was diluted with 500 ml. of water, the oily precipitate was shaken out with 200 ml. of ether, the ether layer was washed successively with water, KHSO$_4$ solution, water, KHCO$_3$ solution, and water again, and was then dried over anhydrous sodium sulfate. The ether was removed by evaporation in a vacuum and the remaining syrup of 3,5-di(p-toluoyl)-1-methyl-2-deoxy-D-ribofuranoside was dissolved in 100 ml. of methanol containing a trace of HCl (less than 0.01%). After cooling and seeding, 3,5-di(p-toluoyl)-1-methyl-2-deoxy-D-ribofuranoside crystallized slowly. It was allowed to stand 48 hours at 0° and was then filtered with suction. After drying in a vacuum desiccator, the yield amounted to 29 g., corresponding to 75% of theory. The material melted at 74°.

For analysis, it was recrystallized from methanol; it then formed white prisms melting at 76.5°. $\alpha_D^{25} = -6.2$ (2% in chloroform).

*Analysis.*—C$_{22}$H$_{24}$O$_6$, calc'd: C, 68.75; H, 6.25. Found: C, 68.93, 68.73; H, 6.07, 6.21.

Example 7

The syrup of 3,5-di(p-toluoyl)-1-methyl-2-deoxy-D-ribofuranoside obtained from 13.6 g. of 2-deoxy-D-ribofuranose, as described in Example 6, was dissolved in 20 ml. of acetic acid while warming, the solution was cooled to below 10°, and 80 ml. of a saturated solution of anhydrous hydrogen chloride in acetic acid was added at 0–10°. Anhydrous hydrogen chloride was conducted into the solution for a few minutes, whereupon the product crystallized rapidly, filling the whole vessel. After 10 minutes, the crystals were filtered by suction. The filter cake was slurried with 100 ml. of ice-cold absolute ether, the slurry was filtered with suction, and the filter cake was rapidly transferred into a vacuum desiccator and dried in a vacuum over soda lime at room temperature. The yield of 3,5-di(p-toluoyl)-2-deoxy-D-ribofuranosyl chloride amounted to 27.5 g., corresponding to 70.5% of theory. A sample of the material was analyzed, showing the following results:

*Analysis.*—C$_{21}$H$_{11}$O$_5$Cl, calc'd: C, 64.8; H, 5.4; Cl, 9.13. Found: C, 65.57; H, 5.81; Cl, 7.93, 8.15.

The rotation of a freshly prepared 2% solution in chloroform was $\alpha_D^{25} = +108°$. It decreased, however, rapidly, as following:

After 5 min.: $\alpha_D^{25}$ _____ +87°
After 10 min. _____ +67°
After 20 min. _____ +65°
After 30 min. _____ +65°

At the same time, the solution became strongly acidic toward Congo paper. Crystalline ditoluoyldeoxyribofuranosyl chloride could no longer be isolated after 30 minutes, but free toluic acid was obtained by shaking out the solution with bicarbonate.

The 3,5-di(p-toluoyl)-2-deoxy-D-ribofuranosyl chloride melted at 109°, with decomposition and evolution of HCl.

This material was converted to thymidine by further processing as disclosed in Example 4.

*Example 8*

2 g. of syrupy 3,5-di(p-toluoyl)-1-methyl-2-deoxy-D-ribofuranoside, obtained in the manner described in Example 6, was dissolved in 10 ml. of absolute ether and the solution was added to 5 ml. of acetic acid previously saturated with anhydrous HBr at 0°. Anhydrous HBr was conducted into the mixture at −5 to 0° until crystallization occurred (after 5 to 10 minutes). The crystals were immediately filtered by suction and washed on the filter with small portions of ice cold absolute ether. The material was dried in vacuo, first over soda lime, then over phosphorus pentoxide. The product, 3,5-di(p-toluoyl)-2-deoxy-D-ribofuranosyl bromide, when freshly prepared, was an almost white crystalline powder decomposing at 75 to 80°, without melting but with discoloration to purplish-black. Also, when stored for several days at room temperature, the material discolored; after seven days, it formed a dark purple mass.

I claim:

1. A process of making 3,5-diaroyl-1-methyl-2-deoxy-D-ribofuranoside which comprises reacting 1-methyl-2-deoxy-D-ribofuranoside with an aroyl halide wherein that portion of the aroyl group which is exclusive of the carbonyl function is a radical containing not more than ten carbon atoms selected from the class consisting of monocyclic aryl hydrocarbon radicals and negatively substituted monocyclic aryl hydrocarbon radicals.

2. 3,5 - diaroyl - 1 - methyl-2-deoxy-D-ribofuranoside; wherein that portion of the aroyl group which is exclusive of the carbonyl function is a radical containing not more than ten carbon atoms selected from the class consisting of monocyclic aryl hydrocarbon radicals and negatively substituted monocyclic aryl hydrocarbon radicals.

3. 3,5-dibenzoyl-1-methyl-2-deoxy-D-ribofuranoside.

4. 3,5-di(p-toluoyl) - 1 - methyl-2-deoxy-D-ribofuranoside.

5. A process of making 3,5-diaroyl-2-deoxy-D-ribofuranosyl halide which comprises reacting 3,5-diaroyl-1-methyl-2-deoxy-D-ribofuranoside with anhydrous hydrogen halide; wherein the halide is selected from the group consisting of chloride and bromide and wherein that portion of the aroyl group which is exclusive of the carbonyl function is a radical containing not more than ten carbon atoms selected from the class consisting of monocyclic aryl hydrocarbon radicals and negatively substituted monocyclic aryl hydrocarbon radicals.

6. 3,5-diaroyl-2-deoxy-D-ribofuranosyl halide; wherein the halide is selected from the group consisting of chloride and bromide and wherein that portion of the aroyl group which is exclusive of the carbonyl function is a radical containing not more than ten carbon atoms selected from the class consisting of monocyclic aryl hydrocarbon radicals and negatively substituted monocyclic aryl hydrocarbon radicals.

7. 3,5-di(p-toluoyl)-2-deoxy-D-ribofuranosyl chloride.

8. 3,5-di(p-chlorobenzoyl) - 2 - deoxy-D-ribofuranosyl chloride.

9. A process of making 3,5-diaroyl-2-deoxy-D-ribofuranose which comprises hydrolyzing 3,5-diaroyl-2-deoxy-D-ribofuranosyl halide; wherein the halide is selected from the group consisting of chloride and bromide and wherein that portion of the aroyl group which is exclusive of the carbonyl function is a radical containing not more than ten carbon atoms selected from the class consisting of monocyclic aryl hydrocarbon radicals and negatively substituted monocyclic aryl hydrocarbon radicals.

10. A process of making (3,5-diaroyl-2-deoxy-D-ribofuranosyl)urea which comprises reacting 3,5-diaroyl-2-deoxy-D-ribofuranose with urea; wherein that portion of the aroyl group which is exclusive of the carbonyl function is a radical containing not more than ten carbon atoms selected from the class consisting of monocyclic aryl hydrocarbon radicals and negatively substituted monocyclic aryl hydrocarbon radicals.

11. (3,5-diaroyl-2-deoxy-D-ribofuranosyl)urea; wherein that portion of the aroyl group which is exclusive of the carbonyl function is a radical containing not more than ten carbon atoms selected from the class consisting of monocyclic aryl hydrocarbon radicals and negatively substituted monocyclic aryl hydrocarbon radicals.

12. (3,5-dibenzoyl-2-deoxy-D-ribofuranosyl)urea.

13. A process of making 1-($\beta$-[lower alkoxy]-$\alpha$-methylacryloyl)-3-(3,5 - diaroyl - 2 - deoxy-D-ribofuranosyl)urea which comprises reacting (3,5-diaroyl-2-deoxy-D-ribofuranosyl)urea with $\beta$ - (lower alkoxy) - $\alpha$ - methylacryloyl halide; wherein that portion of the aroyl group which is exclusive of the carbonyl function is a radical containing not more than ten carbon atoms selected from the class consisting of monocyclic aryl hydrocarbon radicals and negatively substituted monocyclic aryl hydrocarbon radicals.

14. 1 - ($\beta$-[lower alkoxy]-$\alpha$-methylacryloyl)-3-(3,5-diaroyl-2-deoxy-D-ribofuranosyl)urea; wherein that portion of the aroyl group which is exclusive of the carbonyl function is a radical containing not more than ten carbon atoms selected from the class consisting of monocyclic aryl hydrocarbon radicals and negatively substituted monocyclic aryl hydrocarbon radicals.

15. 1-($\beta$-[lower alkoxy] - $\alpha$ - methylacryloyl)3-(3,5-dibenzoyl-2-deoxy-D-ribofuranosyl)urea.

No references cited.